Jan. 28, 1964  V. H. WANAMAKER  3,119,631
VEHICLE TOWING HITCH
Filed April 21, 1961
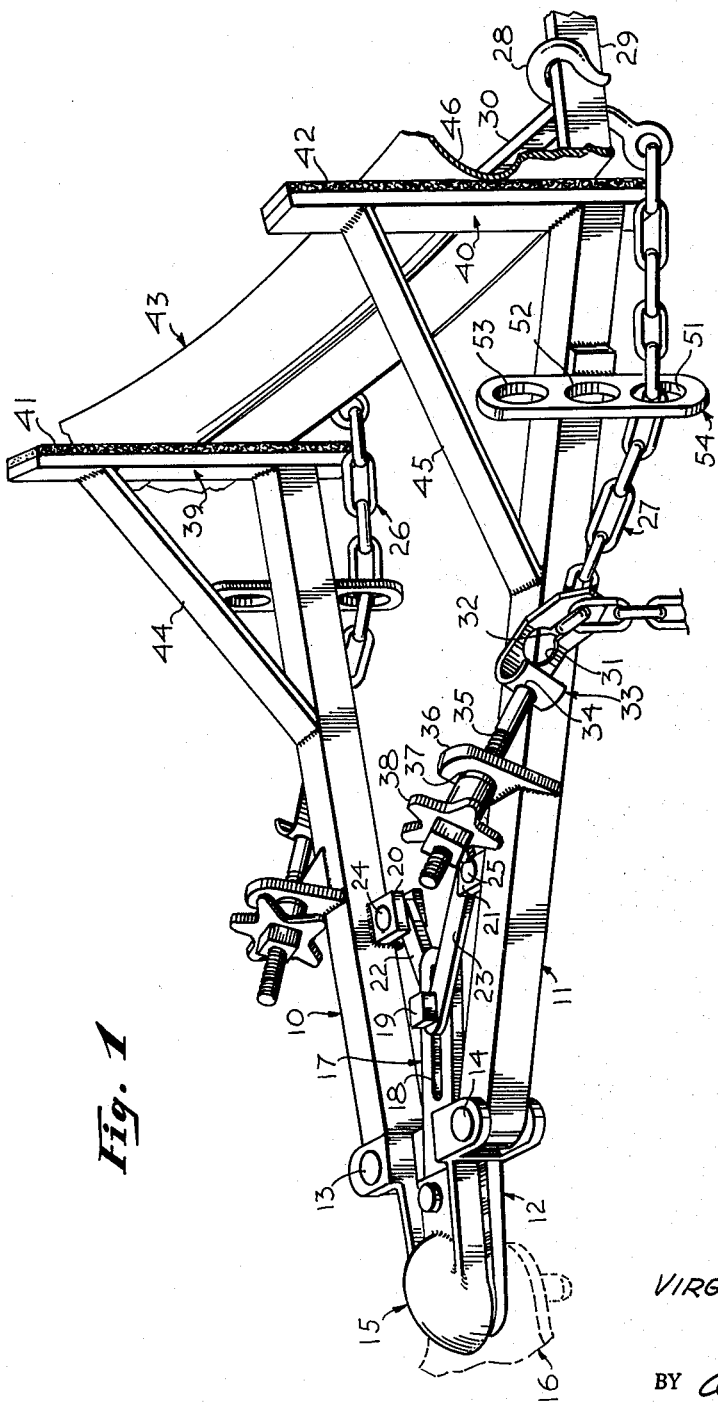
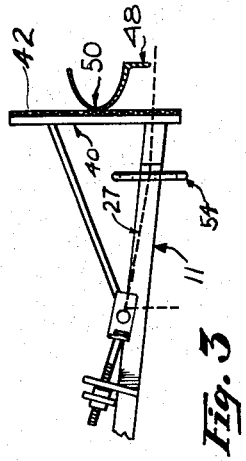
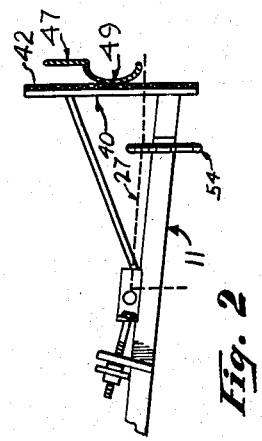
VIRGIL H. WANAMAKER
INVENTOR.
BY *Allan M. Shapiro*
ATTORNEY

United States Patent Office 3,119,631
Patented Jan. 28, 1964

3,119,631
VEHICLE TOWING HITCH
Virgil H. Wanamaker, Los Angeles, Calif., assignor to Wanamaker Mfg. Company, Inc., Burbank, Calif., a corporation of California
Filed Apr. 21, 1961, Ser. No. 104,636
6 Claims. (Cl. 280—446)

The present invention relates to a vehicle towing hitch and, more particularly, to an improved hitch primarily adapted for use in towing an automobile by means of another vehicle.

As is well known to those skilled in the art, the seemingly simple problem of towing a vehicle is replete with difficulties. Although there have been numerous attempts in the past to overcome these difficulties, constant changes in automotive design have introduced new problems and have caused most of the prior art hitches to become obsolete due to their inapplicability to vehicles having modern structural and/or design configurations.

Further, the present invention is concerned with the problems relating to the effects that occur when the towing vehicle slows or stops, particularly during sudden application of the brakes. When a vehicle decelerates, the front end of the vehicle "dives" or dips and, conversely, the rear end moves up. Of course, this effect occurs on both the towing and the towed vehicle. The combination of the upward movement of the rear of the towing vehicle and the downward movement of the front end of the towed vehicle, coupled with the compressive force exerted between the two vehicles, causes the usually horizontal towing hitch to be tipped at an angle with respect to the horizontal. Such tipping causes extreme angular forces to be applied to the hitch. Since a towing hitch, by its very nature and purpose, is designed and adapted primarily for bearing forces in tension and compression in the horizontal plane, such angularly directed forces often result in breakage of one or more structural members of the towing hitch and/or disconnection from, or slippage with respect to, the towed vehicle.

Therefore, it is a primary object of the present invention to provide a vehicle towing hitch with means for maintaining the hitch in a substantially horizontal plane during deceleration of the towing and towed vehicles.

It is another object of the present invention to provide a vehicle towing hitch of universal adaptability to the various front bumper configurations of vehicles to be towed.

Additional objects of the present invention include the provision of a vehicle towing hitch of compact, simple and relatively inexpensive construction that is easily handled and operated.

According to the present invention, a vehicle towing hitch adapted to be connected between a towing vehicle and a towed vehicle, such towed vehicle having a horizontal forward member with a forwardly protruding surface, such as a bumper, comprises longitudinal means disposable in a substantially horizontal plane and having a forward end and rearward end, such forward end being adapted to be effectively connected to the towing vehicle as by a ball and socket connection, vertical means secured to the rearward end and extending upwardly therefrom with its rearwardly directed surface available for abutment against such forwardly protruding surface, flexible towing means such as a chain or cable provided with first and second end connection means, the first connection means being removably attachable to such towed vehicle as with a hook, the second connection means being attachable to the longitudinal means, and adjustable means for applying tension force to the flexible towing means for causing the vertical means surface to forcibly abut against such forward vehicle protrusion. Thus, the chain or other towing means carries the tension loads during the normal towing operation and also maintains the vertical means in position against the bumper of the towed vehicle since the towing forces are horizontal. During deceleration or other occurrences which cause non-tension forces to be applied to the hitch between the vehicles, the towed vehicle's bumper pushes against the vertical means. Since the vertical means is extended above the longitudinal means, it acts as a moment arm to apply torque to the hitch in a direction to cause the forward end to move downwardly and the rearward end to move upwardly. Such movements being the reverse of the normal deceleration movements of the ends of the vehicles to which the respective ends of the hitch are attached, the hitch operates as a torque coupler which counteracts the vertical movements of the vehicles.

In a preferred embodiment of the present invention, each of the longitudinal means is provided with force guidance means in laterally restraining engagement with the towing means at a point between the ends thereof and below the point or points of contact of the vertical means with the bumper. In this manner, the towing means assists in maintaining the desired positional relationships and directional forces.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a perspective view of apparatus in accordance with the present invention in position for towing a vehicle; and FIGURES 2 and 3 are fragmentary elevational views of the apparatus illustrated in FIGURE 1, showing various positions of the vertical members with different bumper configurations, the towing means being shown diagrammatically.

Referring to the drawings, there are seen a pair of longitudinal members 10 and 11 pivotally mounted to a socket member 12 by means of respective pivot pins 13 and 14 at their forward ends so that members 10 and 11 may be pivotally rotated in angularly closed or opened relationship to each other. The socket member 12 is provided with a socket portion 15 of any well known type of construction for attachment to a ball (not shown) forming part of an assembly, fragmentarily illustrated and generally indicated at 16, of any well known type and secured to the towing vehicle (not shown). The socket member 12 is provided with an extension member 17 having a longitudinal slot 18 along which a bolt 19 may be moved. Longitudinal members 10 and 11 are provided with respective flanges 20 and 21 to which respective cross bars 22 and 23 are pivotally mounted by respective pivot pins 24 and 25. The cross bars 22 and 23 are provided with end holes (not shown) through which the bolt 19 is passed for selectively locking engagement of the cross bars 22 and 23 with respect to the extension member 17. The bolt 19 may be located in any position along the slot 18 in accordance with the desired divergence of the longitudinal members 10 and 11, as determined by the corresponding positions of the cross bars 22 and 23.

Since the elements associated with each of the chains 26 and 27 are identical, only those elements associated with chain 27 will be described. Chain 27 is provided with connection means, such as hook 28, at one end for removable attachment to a frame member 29 of the towed vehicle (not shown) at any convenient attachment point, such as behind a frame cross bar 30. The other end of the chain 27 is passable through an eyelet 31 which opens into a slot 32 for receiving a link of the chain 27 in locking engagement therewith, the eyelet 31 and slot 32 being formed in a member 33 which is also provided with an aperture 34 for receiving the shank of a threaded bolt 35. The longitudinal member 11 has a flange 36 provided with an aperture 37 for slidably receiving the shank of the bolt 35. A handle nut 38 is threaded upon the bolt 35 and, as it is tightened, draws the bolt 35 so as to apply tension to the chain 27 for locking the overall apparatus in its operatively engaged position with respect to the towed vehicle.

The rearward ends of the longitudinal members 10 and 11 are provided with respective vertical members 39 and 40 extending upwardly therefrom and having surface pads 41 and 42 composed of a resilient material such as, for example, rubber or impregnated fibrous material to avoid slippage and marring of the surface of the bumper 43 against which they are disposed in abutment engagement. Struts 44 and 45 are secured, as by welding, to the respective vertical members 39 and 40 and longitudinal members 10 and 11 for strength and rigidity.

In FIGURE 1, the bumper 43 is seen to be of the type having a forwardly protruding portion 46 located substantially in the vertical middle of the bumper 43. In FIGURES 2 and 3, the respective bumpers 47 and 48 have their forwardly protruding portions 49 and 50 located at the bottom and top of their respective bumpers. Of course, there are numerous other variations of vehicle bumpers having differing configurations of such forward protrusions or none at all, and the three configurations illustrated are merely for the purpose of generally indicating the adaptability and use of the vehicle towing hitch of the present invention for all bumpers. Since the vertical members 39 and 40 present planar surfaces to the bumper without any bumper clamping configuration or action, the apparatus may be utilized for towing any vehicle having any configuration of bumper or other forward surface which extends forwardly from the frame of the vehicle.

The chain 27 is passable through any one of the holes 51, 52 or 53 in a restraining member 54 which is secured, as by welding, to the longitudinal member 11 in a location substantially adjacent to the vertical member 40. Depending upon the configuration of the bumpers 43, 47 or 48 and, therefore, upon the disposition of the vertical member 40 with respect to such bumper, the chain 27 is passed through that selected one of the restraining member holes 51, 52 or 53 which permits the chain 27 to be as nearly horizontal as possible so as to properly guide the forces applied by the towing chain 27. It should be noted that the selected hole is as low as, or lower than, the lowest portion of the chain 27 so that the chain 27 exerts an upward force on the force guidance or restraining member 54 and the rearward portion of the longitudinal member 11. Thus, the restraining member 54 and the chain 27 cooperate to serve several purposes such as, for example, supporting the rearward portions of the hitch during the initial coupling of the hitch to the vehicle to be towed as well as during the normal towing operation by laterally applying an upward force component, maintaining a substantially horizontal direction for the major towing tension force component without damaging the bumper by contact of the chain therewith, and providing a horizontal force component above which the vertical member 40 can act as a moment arm during deceleration of the vehicles so that a counterclockwise (in the drawings) torque can be assuredly applied to the hitch to counteract the vehicles' vertical movements and maintain the longitudinal members in a substantially horizontal plane.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A vehicle towing hitch adapted to be connected between a towing vehicle and a towed vehicle, such towed vehicle having a horizontal forward member with a forwardly protruding surface, comprising: longitudinal means disposable in a substantially horizontal plane and having a forward end and a rearward end, said forward end being adapted to be effectively connected to such towing vehicle; vertical means secured to said rearward end and extending upwardly therefrom, said vertical means having a rearwardly directed planar surface of which any selected portion may be disposed in abutment against such forwardly protruding surface; flexible towing means provided with first and second end connection means, said first connection means being removably attachable to such towed vehicle, said second connection means being attachable to said longitudinal means and including adjustable means for applying tension force to said flexible towing means for causing said vertical means surface portion to forcibly abut against such towed vehicle's protruding surface, said adjustable means comprising threaded bolt and handle-nut means for attaining any desired magnitude of such tension force; and force guidance means secured to said longitudinal means and in laterally restraining engagement with said flexible towing means between said first and second end connection means, said guidance means having a downwardly directed horizontal surface located lower than said rearwardly directed surface portion of said vertical means whereby said flexible towing means applies a horizontal tension force component below such surface portion between said vehicle to be towed and said longitudinal means and applies an upward force to said horizontal surface of said force guidance means.

2. A vehicle towing hitch in accordance with claim 1 wherein said force guidance means is secured to said longitudinal means adjacent to said vertical means whereby said upward force tends to upwardly maintain said vertical means.

3. A vehicle towing hitch adapted to be connected between a towing vehicle and a towed vehicle, such towed vehicle having a horizontal forward member with a forwardly protruding surface, comprising: longitudinal means disposable in a substantially horizontal plane and having a forward end and a rearward end, said forward end being adapted to be effectively connected to such towing vehicle; vertical means secured to said rearward end and extending upwardly therefrom, said vertical means having a rearwardly directed planar surface of which any selected portion may be disposed in abutment against such forwardly protruding surface; flexible towing means provided with first and second end connection means, said first connection means being removably attachable to such towed vehicle, said second connection means being attachable to said longitudinal means and including adjustable means for applying tension force to said flexible towing means for causing said vertical means surface portion to forcibly abut against such towed vehicle's protruding surface; and force guidance means secured to said longitudinal means and in laterally and vertically restraining engagement with said flexible towing means between said first and second end connection means, said guidance means having a downwardly directed horizontal surface engaging said flexible towing means whereby said flexible towing means applies an upward force to said horizontal surface for upwardly supporting said longitudinal means.

4. A vehicle towing hitch in accordance with claim 3 wherein said force guidance means includes a plurality of downwardly directed horizontal surfaces in vertically spaced relationship whereby any one of said horizontal surfaces may be preselected for application of such upward force in accordance with said selected abutting portion of said rearwardly directed planar surface.

5. A vehicle towing hitch adapted to be connected between a towing vehicle and a towed vehicle, such towed vehicle having a horizontal forward member with a forwardly protruding surface, comprising: longitudinal means disposable in a substantially horizontal plane and having a forward end and a rearward end, said forward end being adapted to be effectively connected to such towing vehicle; vertical means secured to said rearward end and extending upwardly therefrom, said vertical means having a rearwardly directed planar surface of which any selected portion may be disposed in abutment against such forwardly protruding surface; flexible towing means provided with first and second end connection means, said first connection means being removably attachable to such towed vehicle, said second connection means being attachable to said longitudinal means and including adjustable means for applying tension forces to said flexible towing means for causing said vertical means surface portion to forcibly abut against such towed vehicle's protruding surface; and force guidance means secured to said longitudinal means and in laterally restraining engagement with said flexible towing means between said first and second end connection means, said guidance means having a downwardly directed horizontal surface located lower than said rearwardly directed surface portion of said vertical means so that the horizontal tension force component applied by said towing means between said vehicle to be towed and said longitudinal means is located lower than said abutting surface portion whereby, upon deceleration of said vehicles, said protruding surface of said towed vehicle applies a force to said abutting surface portion resulting in a torque in said longitudinal means in opposition to the normal direction of rotation thereof.

6. A vehicle towing hitch in accordance with claim 5 wherein said force guidance means includes a plurality of downwardly directed horizontal surfaces in vertically spaced relationship whereby any one of said horizontal surfaces may be preselected in accordance with said selected abutting portion of said rearwardly directed planar surface.

References Cited in the file of this patent
UNITED STATES PATENTS

| | | |
|---|---|---|
| 2,693,369 | Gross | Nov. 2, 1954 |
| 2,840,392 | Miles | June 24, 1958 |
| 2,887,325 | Warren | May 19, 1959 |
| 3,000,652 | Hawkins | Sept. 19, 1961 |